United States Patent [19]

Wake

[11] Patent Number: 5,289,177

[45] Date of Patent: Feb. 22, 1994

[54] BURGLARPROOF DEVICE FOR VEHICLE

[76] Inventor: Kiyoyasu Wake, No. 57-1, 3-chome, Utsukushigaoka, Midori-ku, Yokohama-shi, Kanagawa-ken, 227, Japan

[21] Appl. No.: 582,640

[22] Filed: Sep. 12, 1990

[51] Int. Cl.$^5$ ............................................. H04Q 1/00
[52] U.S. Cl. ............................ 340/825.31; 307/10.2; 70/278; 340/825.34
[58] Field of Search ............ 340/825.31, 825.33, 340/825.34, 825.32, 542; 307/10.2, 10.3, 10.4, 10.6; 361/172; 180/272, 287; 70/237, 276, 278, 413; 235/382, 382.5, 449, 493

[56] References Cited

U.S. PATENT DOCUMENTS

| | | | |
|---|---|---|---|
| 2,689,279 | 9/1954 | Noregaard | 70/413 |
| 3,842,629 | 9/1974 | Pazer | 340/825.31 |
| 4,050,063 | 9/1977 | Schull | 70/278 |
| 4,229,959 | 10/1980 | Easley | 70/413 |
| 4,274,080 | 6/1981 | Branken | 340/825.31 |
| 4,296,402 | 10/1981 | Szczepanski | 180/287 |
| 4,392,134 | 7/1983 | Lutz | 70/413 |
| 4,399,673 | 8/1983 | Gotanda | 70/276 |

FOREIGN PATENT DOCUMENTS 2055951  3/1981  United Kingdom .

Primary Examiner—Donald J. Yusko
Assistant Examiner—Brian Zimmerman
Attorney, Agent, or Firm—Edwin E. Greigg; Ronald E. Greigg

[57] ABSTRACT

This invention relates to a burglarproof key cylinder lock which comprises an outer tubular member, and an inner tubular member rotatably provided within the outer tubular member. A properly coded magnet key is inserted into the inner tubular member. The outer tubular member is provided with at least one switch member therein which is turned ON when a properly coded magnet key is inserted into the inner tubular member. An input signal discrimination circuit is provided for cutting off output signals to supply elements essential for the operation of an engine for a vehicle in case a key other than the properly coded key is inserted.

19 Claims, 13 Drawing Sheets

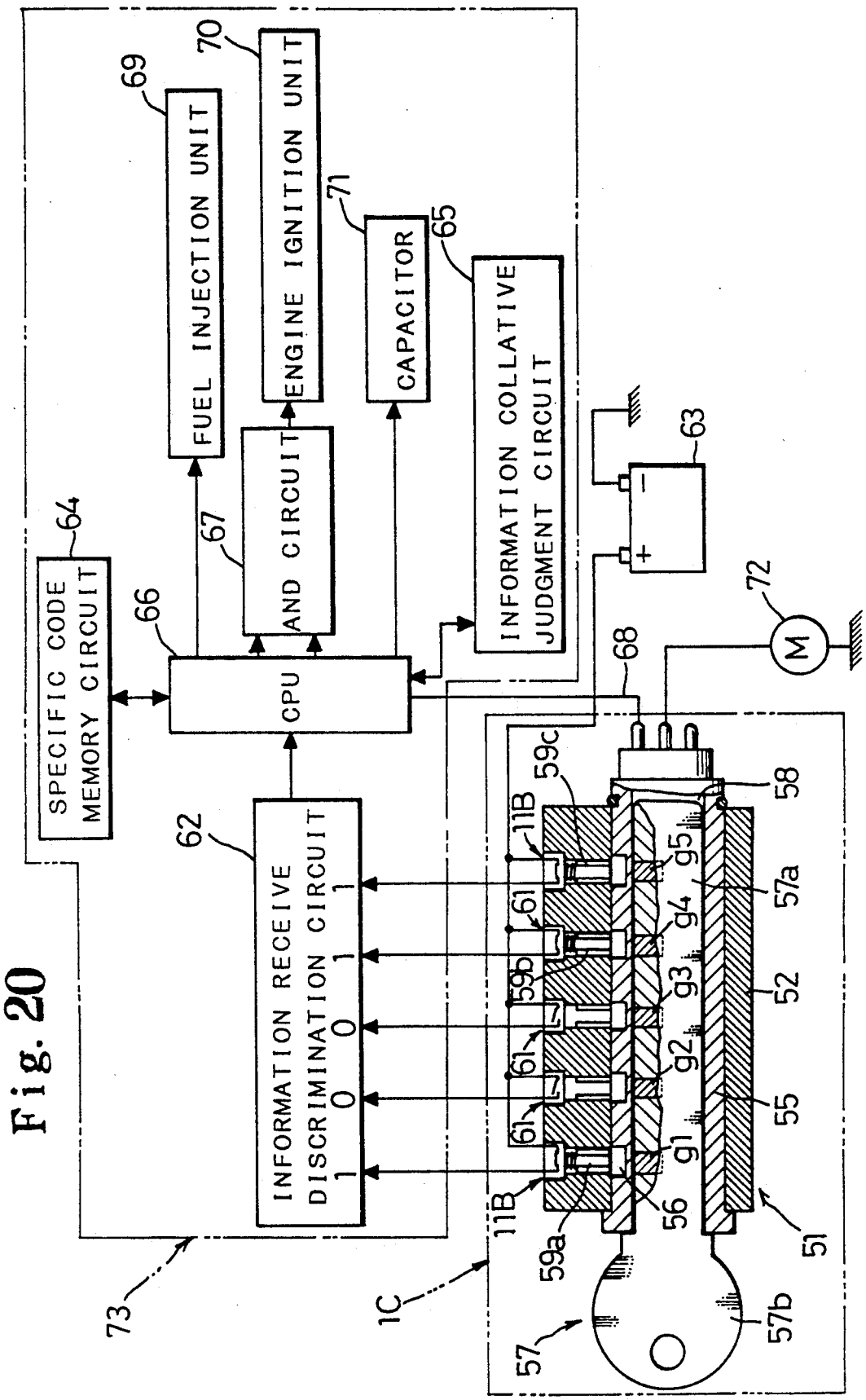

5,289,177

BURGLARPROOF DEVICE FOR VEHICLE

BACKGROUND OF THE INVENTION

This invention relates to a burglarproof device for a vehicle.

Conventionally, as a device of this kind, there is an embodiment disclosed in, e.g., Japanese Patent Application Laid Open No. 5621/89. This embodiment essentially comprises a key switch unit having a key switch provided in a steering column on the vehicle side, a control unit for controlling starting of an engine, and a key unit adapted to be inserted into the key switch unit to permit the engine to be started.

However, the above-mentioned embodiment has the following drawbacks recited below.

In the key unit and the control unit, transmitters, each including a CPU for memorizing specific codes set for each vehicle, are incorporated therein, respectively. Thus, such units are of complicated structure as a whole.

Each key unit includes therein a CPU, a light emitting element, a plurality of contacts, etc., and these electronic elements are complicatedly combined in the key unit. For this reason, there is a high probability that the key unit becomes out of order.

If the key unit itself has become out of order, there would occur an inconvenience such that the engine cannot be started in any way by the key operation.

SUMMARY OF THE INVENTION

With the above-mentioned drawbacks with the prior art in view, an object of this invention is to provide a burglarproof device for a vehicle, which prevents an engine from being started by unfair or illicit means such as a duplicate key or direct connection of electric wires, etc. This invention can eliminate the inconvenience of having the engine unable to be started because of troubles in the key itself and/or troubles in the key cylinder lock.

A burglarproof device for a vehicle according to this invention comprises a proper magnet key adapted to be inserted into a key cylinder lock for a vehicle, a switch member provided in the key cylinder lock, which switch is closed in response to insertion of the magnet key and opened by removal of the magnet key, and input signal discrimination means for cutting off output signals to elements essential for the operation of an engine for a vehicle in the case of a key different from the proper magnet key using a power supply signal delivered from a power supply through the switch member.

In another embodiment, there is provided a central processing unit (CPU) operative to discriminate between the presence and absence of power supply signals respectively delivered from a plurality of switch members provided in the key cylinder lock to deliver output signals to supply elements essential for the operation of the engine for the vehicle only when the above-mentioned proper magnet key is inserted into the key cylinder lock.

BRIEF DESCRIPTION OF THE DRAWINGS

FIG. 1 is a model view showing an arrangement of the first embodiment of this invention;

FIGS. 2–5 are schematic explanatory views showing essential parts of this invention;

FIGS. 6 and 7 are explanatory views showing switch members of this invention;

FIG. 8 is an electric block diagram of the first embodiment;

FIGS. 9–14 are explanatory views showing different modified embodiments of the first embodiment;

FIGS. 15–20 show a second embodiment of this invention. More particularly, FIG. 15 is a model view showing an arrangement of the second embodiment;

FIGS. 16–19 are schematic explanatory views showing essential parts of the second embodiment; and FIG. 20 is an electric block diagram of the second embodiment shown in FIG. 15.

DESCRIPTION OF THE PREFERRED EMBODIMENTS

Preferred embodiments of this invention will be described in detail with reference to the attached drawings.

FIGS. 1–14 show a first embodiment of this invention.

Figure 1:
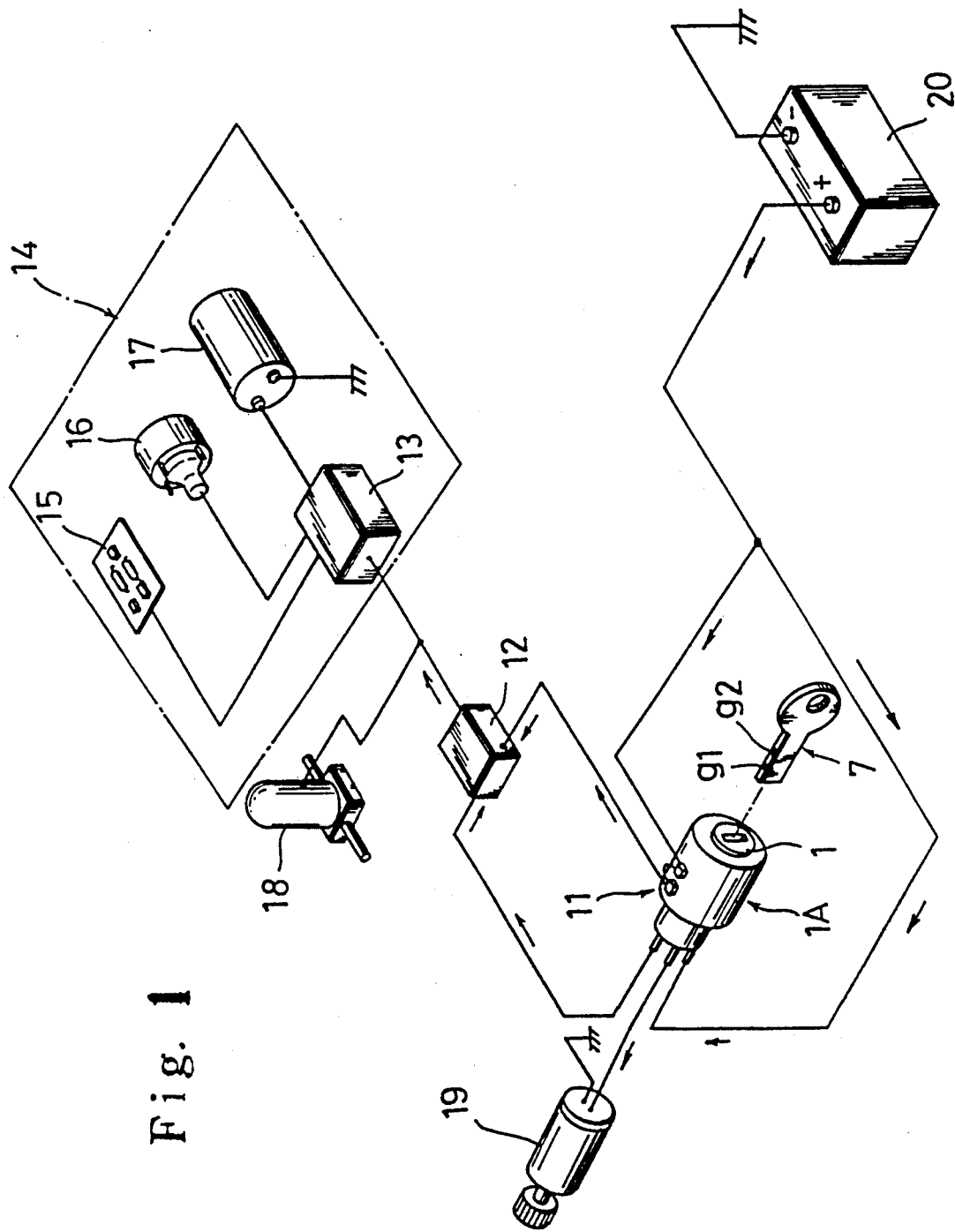
FIGS. 1–14 show a first embodiment of this invention. More particularly.

In FIG. 1, reference numeral 1 denotes a key cylinder lock constituting a part of an ignition coil or a key switch 1A for a switch provided on the steering column of an automotive vehicle. This key cylinder lock 1 is constituted, e.g., as shown in FIGS. 2–5.

Namely, reference numeral 2 denotes an outer tubular member having a predetermined length. An outer hole 3 and a coaxial smaller diameter inner hole 4, communicating with each other and intersecting with each other, are provided in the outer tubular member 2 from a suitable portion of the outer circumferential portion toward the radial direction. In this embodiment, two penetration holes each comprised of outer hole 3 and inner hole 4 are formed at a required interval along the length of outer tubular member 2.

Reference numeral 5 denotes an inner tubular member rotatably received over a predetermined angular range within the outer tubular member 2. Grooves 6 of a suitable size ar formed at portions corresponding to the above-mentioned penetration holes of the outer circumferential portion of the inner tubular member 5, respectively. At the central portion of the inner tubular member 5, a key hole 8 corresponding to a key body 7A of a magnetic key 7 shown in FIG. 4 is opened.

Reference numeral 9 denotes movable obstruction elements each accommodated within both the inner hole 4 of the outer tubular member 2 and the groove 6 of the inner tubular member 5. In this embodiment, a plurality of magnet pin tumblers 9a and 9b are used. Each movable obstruction element 9 is biased toward the groove 6 of the inner tubular member by a spring member 10 having a relatively weak spring force fitted into the inner hole 4 of the outer tubular member in a locked state or before the magnet key 7 is inserted. This magnetic key 7 is comprised of a key body 7a inserted into the key hole and a key holding portion 7b integrally formed with the key body 7a. As shown in FIG. 4, a plurality of magnets g1 and g2 are embedded at the upper side portion of the key body 7a with a predetermined spacing therebetween. The polarities of these plural magnets g1 and g2 may be arbitrarily combined.

Figure 6:
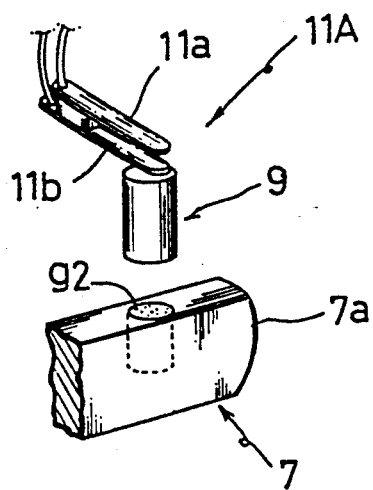
Figure 7:
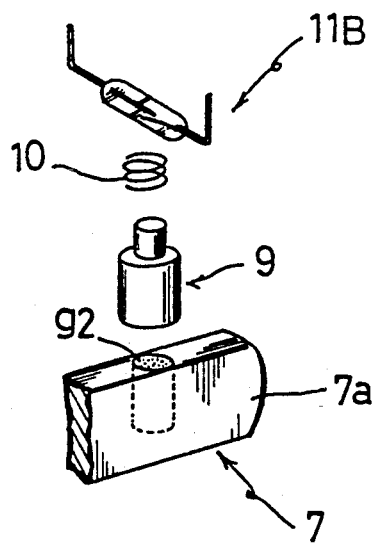

Reference numeral 11 denotes a switch member which is provided in the key cylinder lock 1 of the key switch 1A for an ignition switch, and which is closed in dependency upon the insertion of the key into the key hole 8 of the magnet key 7 and opened upon removal of the key therefrom. In this embodiment, as shown in FIG. 4, for this purpose, there is provided a magnetic responsive switch 11, which detects that the movable obstruction element 9 jumps up against the spring force of the spring member 10 from the groove 6 of the inner tubular member by insertion of the magnet key 7 and becomes close to the switch, whereby the magnetic responsive switch 11 is brought into a closed state. As a magnetic responsive switch 11, there may be used, e.g., a switch member 11A comprising a fixed contact piece 11a as a fixed contact and a movable contact piece 11b as a movable contact as shown in FIG. 6 or a magnetic responsive lead switch 11B as shown in FIG. 7.

Figure 2:
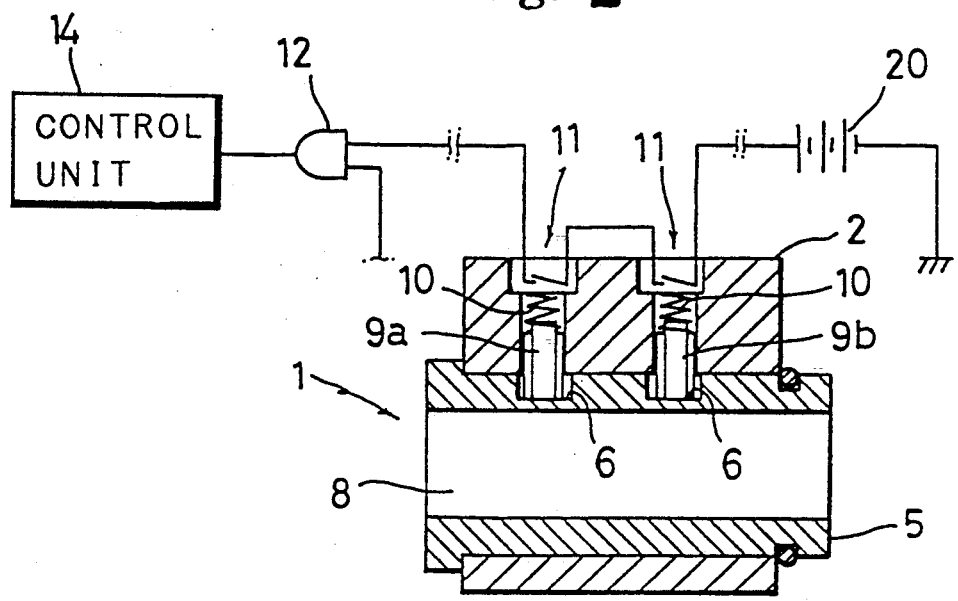
Figure 3:
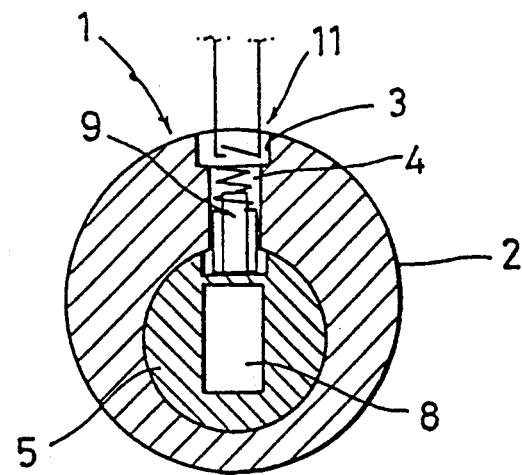
Figure 4:
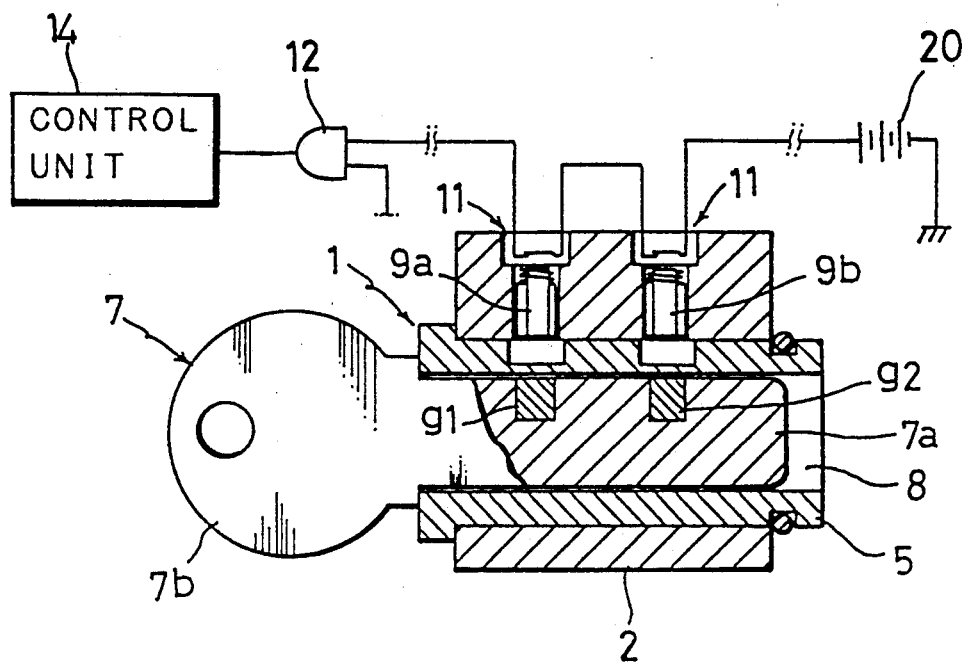

In this embodiment, switch members 11 using a magnetic responsive switch are suitably assembled into a plurality of outer holes 3 of the outer tubular member 2 as shown in FIGS. 2-4, respectively. Respective switch members 11 and 11 are connected in series and are protected by a cover member (not shown).

Reference numeral 12 denotes input signal discrimination means operative to cut off output signals to supply elements essential for the operation of an engine for a vehicle in case a key other than the proper magnet key is inserted in the key hole. As the input signal discrimination means 12, e.g., an AND circuit may be used.

Figure 8:
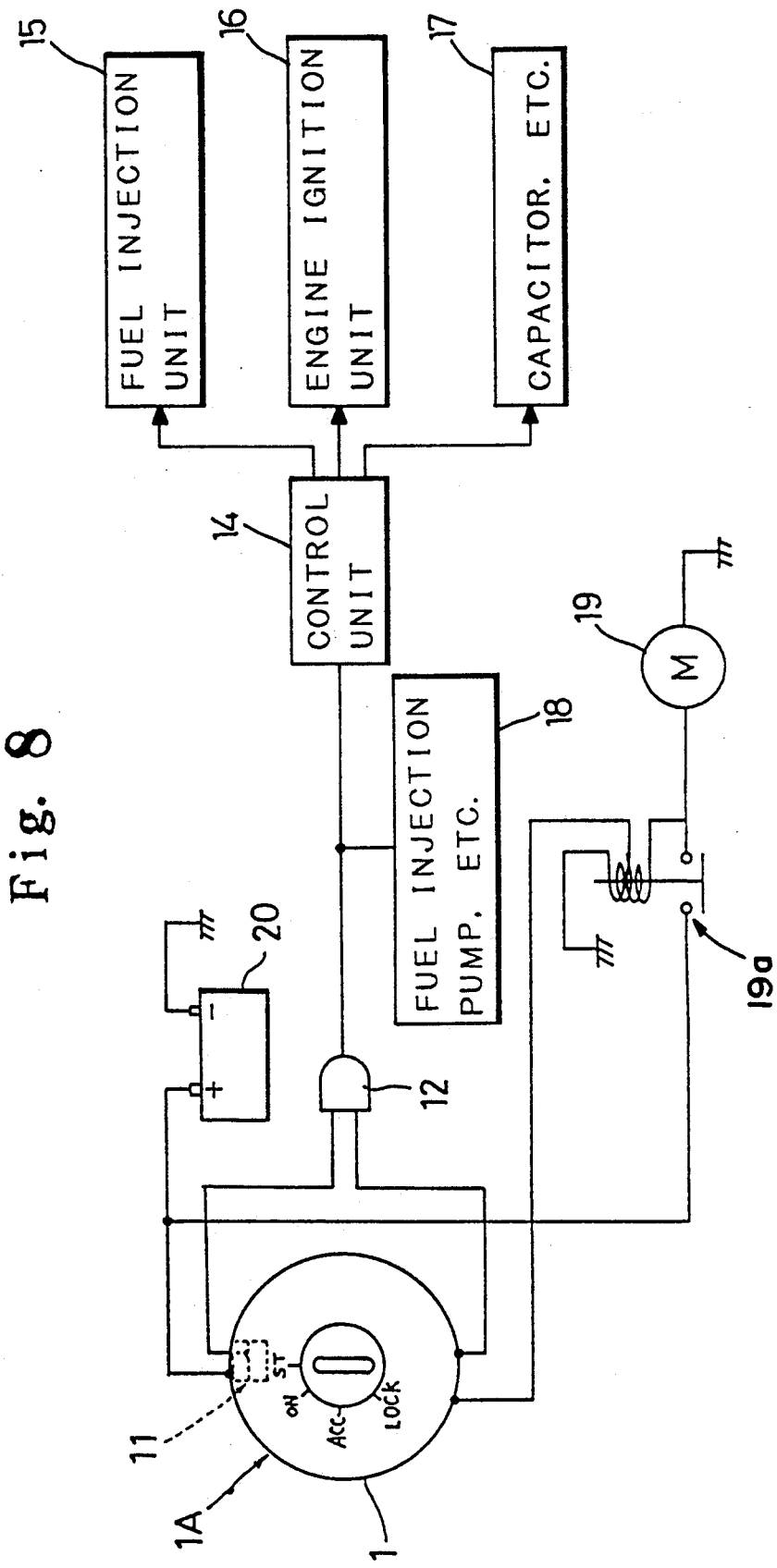
Figure 9:
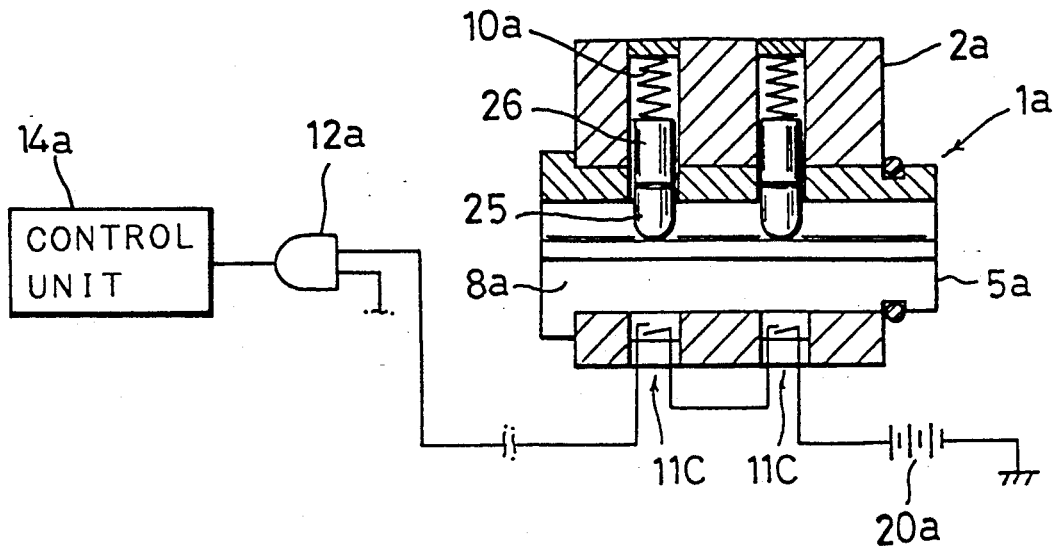
Figure 10:
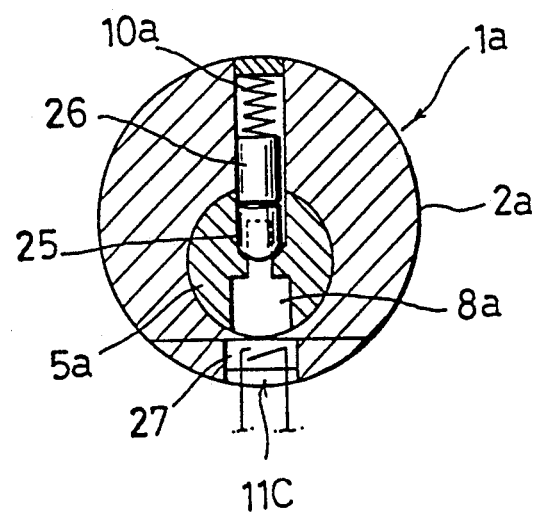

In this embodiment, as shown in FIG. 8, the AND circuit 12 is connected between the switch member of the key cylinder lock 1 and a control unit 14 including a main CPU 13, as shown in FIG. 1, for controlling the drive of the engine. One input terminal of the AND circuit 12 is connected to the switch member 11 side, and the other input terminal thereof is connected to the terminal side of the ignition coil or the ignition switch. Further, the output terminal of the AND circuit 12 is connected to the input terminal of the main CPU 13 see FIG. 1.

Reference numeral 15 denotes a fuel injection unit, reference numeral 16 an engine ignition unit, and reference numeral 17 respective essential elements such as a capacitor. These components are connected to the CPU 13 of the control unit 14, respectively. As long as outputs from the above-mentioned essential supply elements are not delivered to the engine, the engine is not operated. Further, reference numeral 18 denotes an essential element such as a fuel injection pump connected between the AND circuit and the control unit 14 for the engine especially in the case of the diesel engine. As long as this element is not activated, the engine is not able to operate.

In addition, as shown in FIGS. 1 and 8, reference numeral 19 denotes a starter motor which is activated by a starter relay 19a connected to the battery and closed when connected through the key switch 1A and the magnet switch, and activated by rotation of the magnet key 7 using the battery 20 mounted in the vehicle as a power supply.

In the above construction of the first embodiment, as shown in FIGS. 2 and 3, before the magnet key 7 is inserted into the key hole 8 of the key cylinder lock 1, a plurality of magnet pin tumblers 9a and 9b each serving as a movable obstruction element are thrust by the spring members 10, so they are positioned within the grooves 6 and a plurality of magnetic responsive switches 11 each serving as a switch member are in an open state, respectively.

Figure 5:
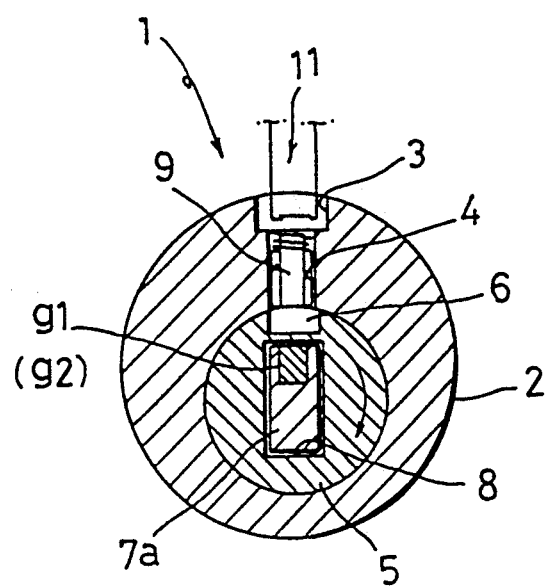

On the other hand, as shown in FIGS. 4 and 5, when the proper magnet key 7 is inserted into the key hole 8 of the key cylinder lock 1, magnetic forces of the magnets g1 and g2 embedded in the magnet key 7 are exerted on corresponding magnetic pin tumblers 9a and 9b having the same polarity, respectively. As a result, the magnetic pin tumblers 9a and 9b jump upwardly against the spring force of the spring members 10 from the grooves 6, and become close to the magnetic responsive switches 11, respectively. Thus, respective magnetic responsive switches 11 detect such changes and are brought into a closed state, respectively. As a result, a power supply signal is delivered from the battery 20 mounted in the vehicle as a power supply to the AND circuit 12 through these magnetic responsive switches 11.

It is to be noted that as long as the magnet key is inserted into the key hole, even if the magnetic key 7 is rotationally moved, since respective magnet pin tumblers 9a and 9b are supported on the outer circumferential surface of the inner tubular member 5, the above-mentioned closed state is continued.

An output signal produced as the result of the fact that the magnet key 11 is rotationally moved so the key switch 1A is passed through the "ON" position shown in FIG. 8, is input to the AND circuit 12. This AND circuit 12 discriminates that both signals are input at the same time to deliver an output signal to the control unit 14 for the engine. Thus, the control unit 14 drives and controls the ignition unit 16, the fuel injection unit 15 for engine, and the like to set the starter motor 19 at the position of "ST", whereby the starter motor 19 is rotated by activation of starter switch 19a and the engine is started.

On the other hand, in the case where a key other than the proper magnet key 7 is inserted into the key hole 8 of the key cylinder lock 1, the movable obstruction element 9 does not entirely move, or all magnet pin tumblers 9a and 9b do not jump up. As a result, the magnetic responsive switch 11 is not entirely brought into a closed state, or all magnetic responsive switches 11 are not brought into a closed state. Accordingly, a power supply signal is not delivered from the power supply 20 to the AND circuit 12 through the switch member 11. Therefore, even if a procedure is taken to rotate the magnet key 7 to start the starter motor 19, no output signal is delivered from the AND circuit 12 to the control unit 14, with the result that the engine is not started.

A different modified embodiment of the above mentioned first embodiment of this invention will now be described. The same or similar reference numerals are attached to the same portions as those of the first embodiment, respectively, and their repetitive explanation will be omitted.

In the embodiment shown in FIGS. 9 to 14, the structure of a key cylinder lock 1a mainly differs from that of the above-described embodiment of this invention.

Namely, reference numeral IB denotes a key switch for an ignition switch and reference numeral 1a a key cylinder lock. This key cylinder lock 1a essentially comprises an outer tubular member 2a, an inner tubular member 5a rotatably provided within the outer tubular member 2a, and driver pins 26 adapted to thrust movable pins 25 provided in the outer tubular member 2a and provided in the inner tubular member 5a by spring members 10a in a radial direction of the key hole 8a for a magnet key 7A at all times. At suitable portions of thin thickness of the outer tubular member 2a, there are formed a plurality of penetration holes 27 adapted so that a plurality of magnetic responsive switches 11c each serving as a switch member can be fitted.

Figure 11:
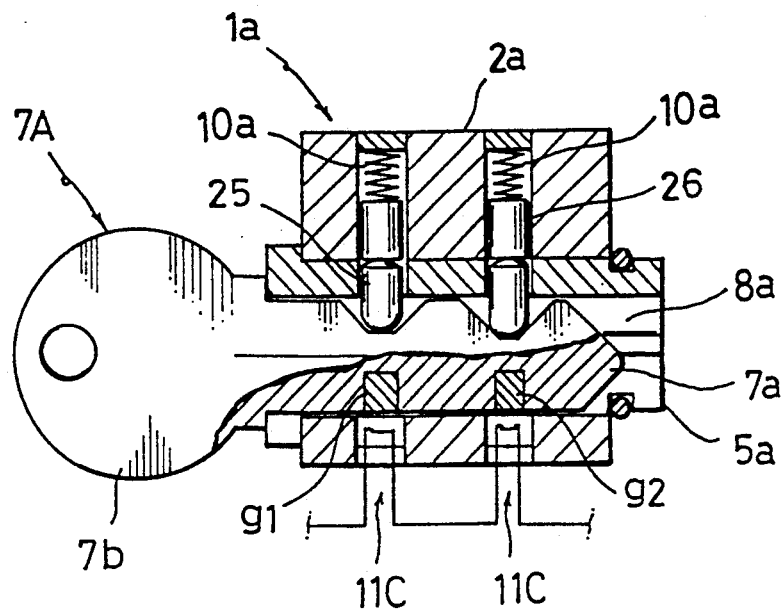
Figure 12:
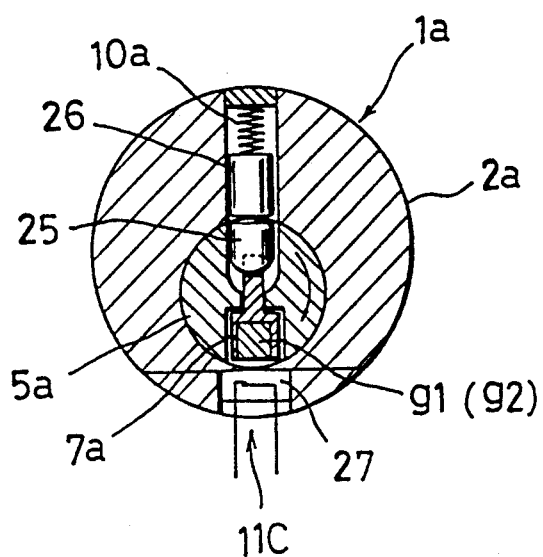

As can be seen in FIG. 11, the properly coded magnet key 7A in this embodiment includes both mechanical and magnetic coding. The top edge of the key includes 5 cut out portions which correspond to the particular lengths of movable pins 25. The bottom edge of the key includes a plurality of magnets g1 and g2 embedded in the key. The polarities of these magnets are chosen to cooperate with the magnetic responsive switches 11c (sl) and 11C (S2). It can be seen that for a key to operate correctly in this embodiment the key must be properly coded mechanically as well as magnetically.

Figure 13:
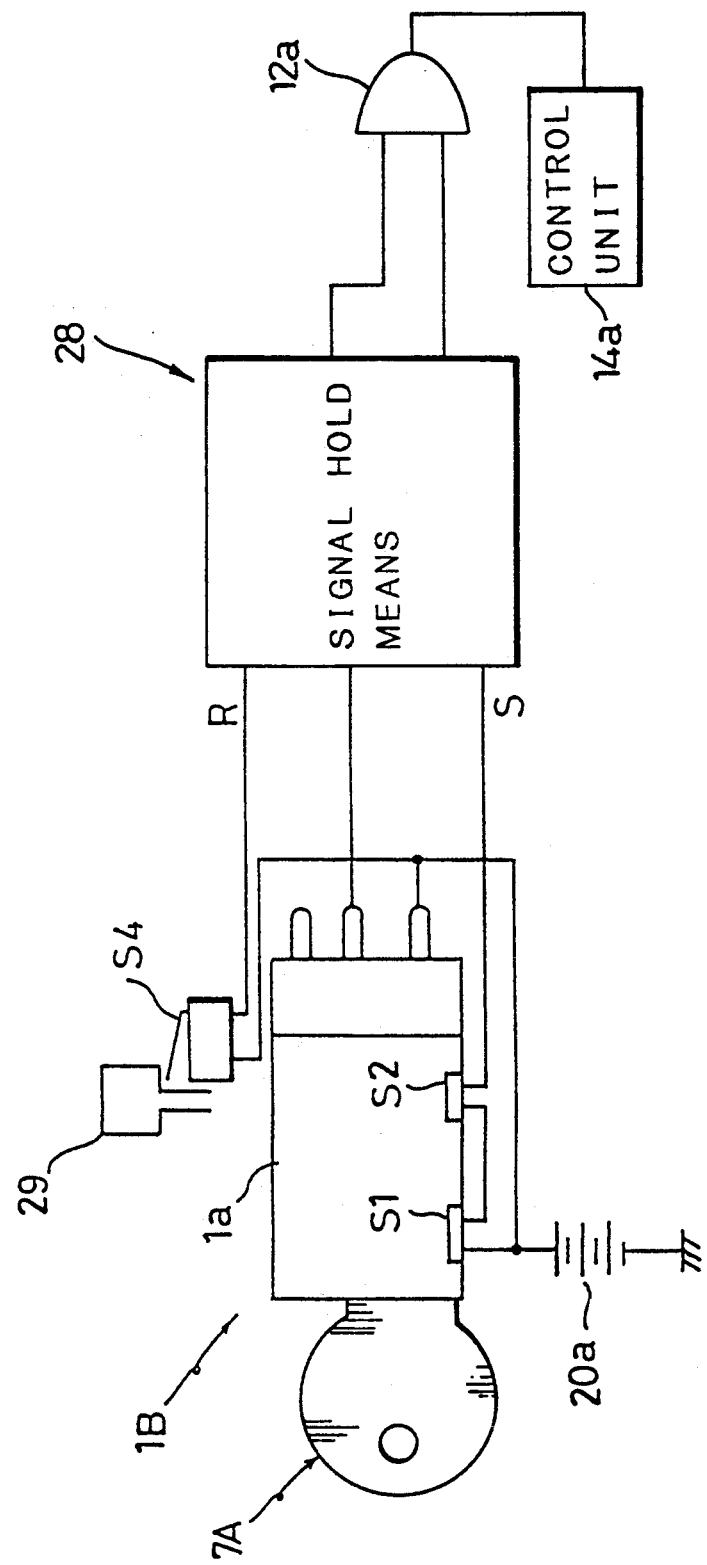
Figure 14:
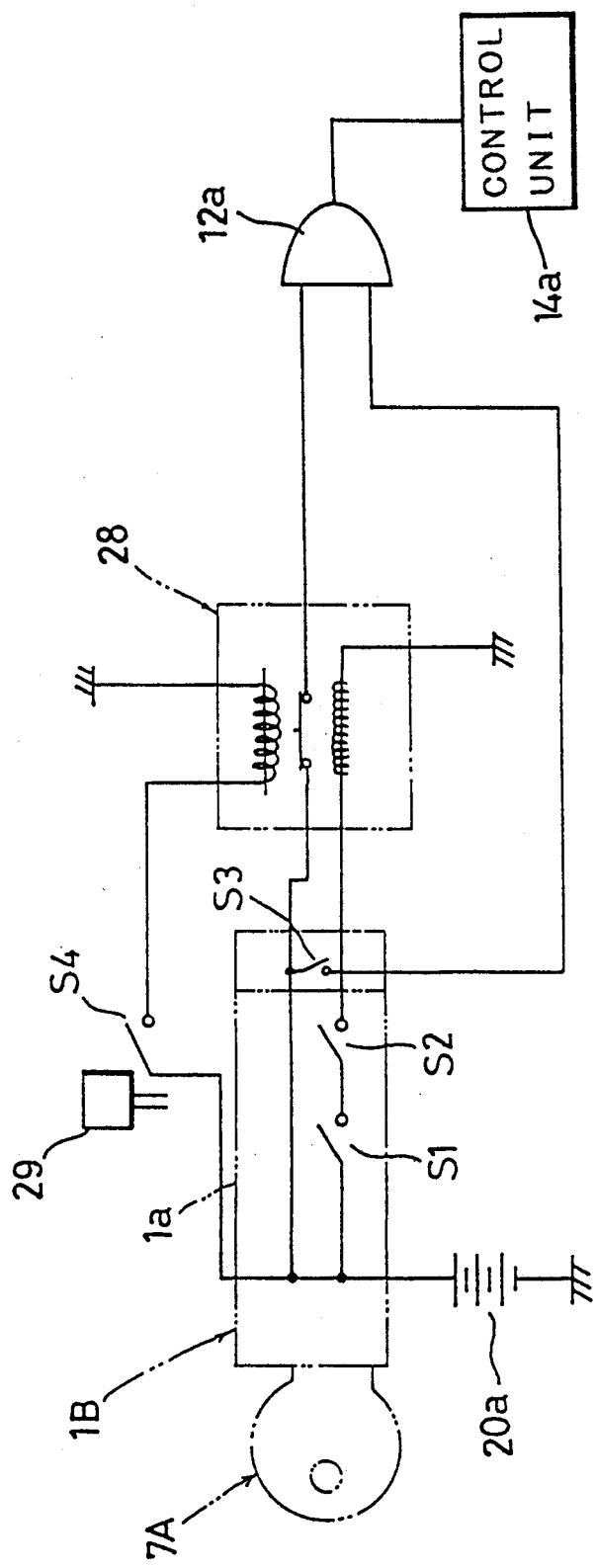

A further different point is that, as shown in FIGS. 13 and 14, signal hold means 28, for temporarily holding an output signal delivered to the AND circuit as input signal discrimination means 12a, is provided between the key switch 1B and the AND circuit 12a.

In the above-mentioned construction, when the proper magnet key 7A is inserted into the key hole 8a of the key cylinder lock 1a, respective magnetic responsive switches 11C (S1) and 11C (S2) of the key switch 1B are turned ON. Thus, the relay of the signal hold means 28 is turned ON.

When the magnet key 7 is rotated, since the magnets g1 and g2 of the magnet key 7A are then away from the magnetic responsive switches 11C (SI) and 11C (S2), these switches are turned OFF, but the relay of the signal hold means 28 holds a output signal from the magnetic responsive switch 11C side as it is. As previously described with reference to FIG. 8, when the key switch 1B is passed through the position of "ON", the switch S3 is turned ON. As shown in FIG. 14, the lower side of switch S3 is connected directly to AND circuit 12a. Due to current on the signal hold means 28 side and a current in the switch S3 on the key switch 1B side, the AND circuit 12a becomes operative to deliver its output signal to a control unit 14a for the engine.

On the other hand, when a push button 29 for drawing out a key provided in the steering column shown in FIGS. 13 and 14 at the time of drawing out the magnet key 7A from the key cylinder lock 1a is pushed down, the switch S4 interlocking with the push button 29 is turned ON. As a result, the relay of the signal hold means 28 is turned OFF. Until the proper magnet key 7A is inserted again into the key cylinder lock 1a and the magnetic responsive switches S1 and S2 are turned ON again, the relay of the signal hold means 28 is kept in an OFF state.

Accordingly, also in this embodiment of FIGS. 9–14, when the proper magnet key 7A is used, an output signal is delivered from the AND circuit to the control unit 14a for the engine. Thus, when the starter motor is activated, the engine is started. On the other hand, in the case of a key different from the proper magnet key 7A, even if the starter motor is activated, the engine is not started.

It is to be noted that the supply elements essential for the operation of the engine should be taken as units or members which would fail to normally operate the engine if there is lacking in any one of them, such as, for example, ignition unit, fuel injection unit for engine, fuel pump, starter motor, and the like.

Accordingly, an arrangement may be employed such that an AND circuit 12 is provided in the electric circuit between the switch member 11 of the key cylinder lock 1 and the starter motor 19 in order that the starter motor 19 is not activated even if the magnet key is rotated and an output signal is thus delivered to the control unit.

Figure 15:
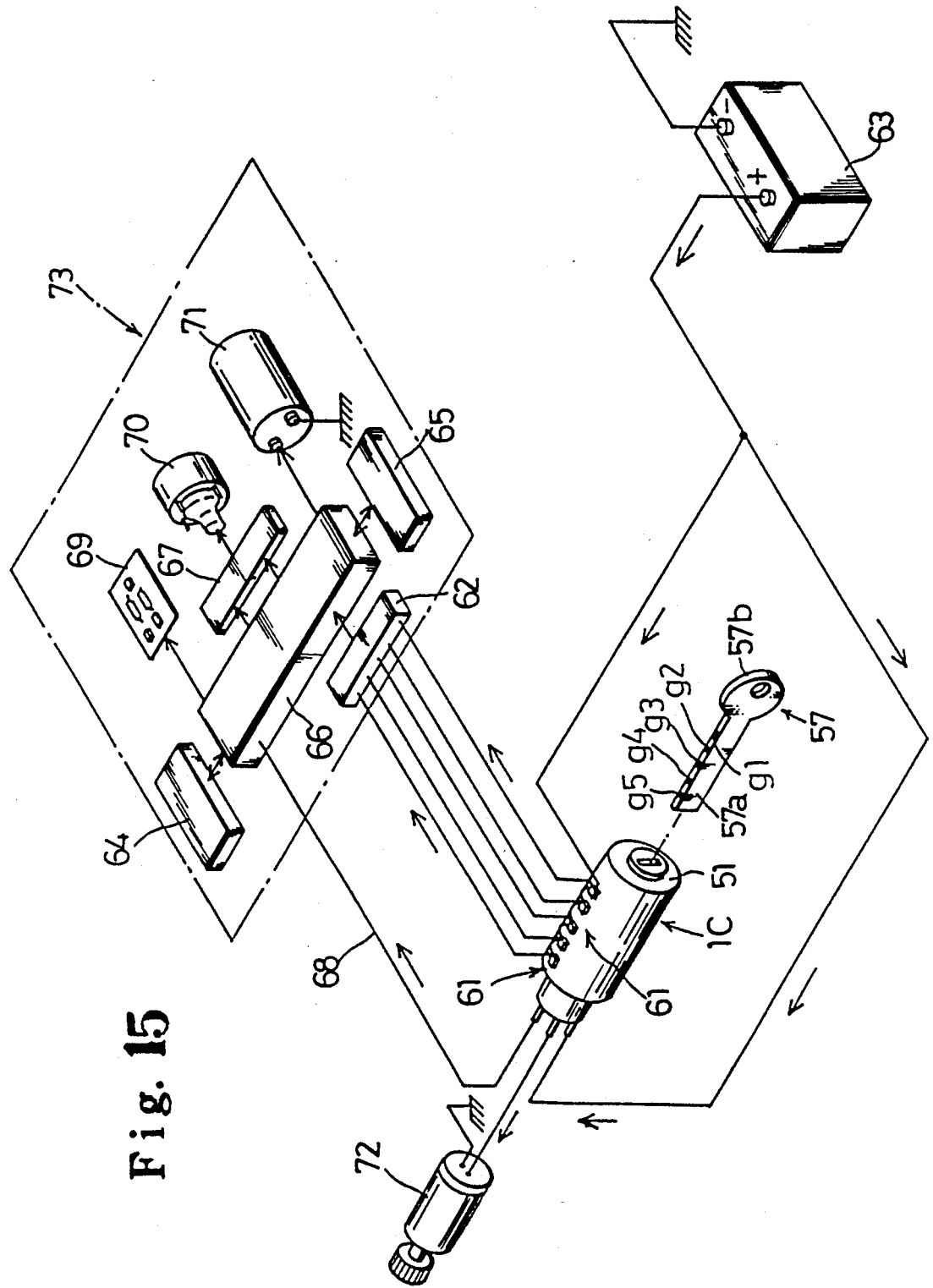

A second embodiment of this invention shown in FIGS. 15 and 20 will now be described in detail.

In explanation of this embodiment, the same portions a those of the above-mentioned first embodiment will b briefly described.

Figure 16:
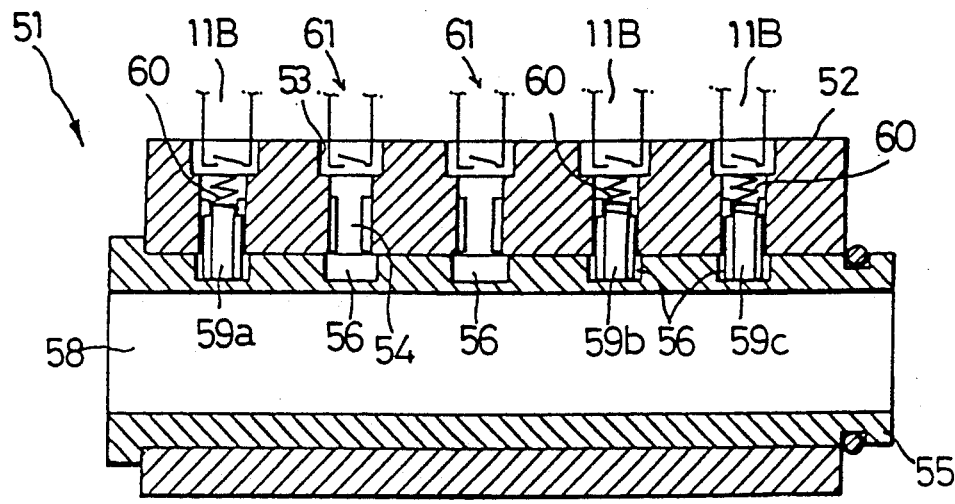

Reference numeral 51 denotes a key cylinder lock. Reference numeral 52 denotes an outer tubular member including an outer hole 53 and an inner hole 54. Five penetration holes in total each comprised of outer hole 53 and inner hole 54 are formed. Reference numeral 55 denotes an inner tubular member including grooves 56 and a key hole 58 corresponding to a key body 57a of a magnet key 57. Reference numeral 59 denotes a movable obstruction element. In this embodiment, three magnet pin tumblers 59a, 59b and 59c are used. For convenience of explanation, penetration holes are respectively labeled "1", "2", "3", "4" and "5" in order from the left side when the state of FIG. 16 is taken as a criterion. The magnet pin tumbler 59a is inserted into the penetration hole "1", no magnet pin tumbler is inserted into the penetration holes "2" and "3", and other magnet pin tumblers 59b and 59c are inserted into the penetration holes "4" and "5", respectively.

Thus, specific codes stored and set into a specific code memory circuit, which will be described later, are determined in dependency upon whether magnet pin tumblers are all inserted into respective penetration holes, or which penetration hole or holes should contain thereunto a magnetic pin tumbler or tumblers and which penetration hole or holes should be empty. It is to be noted that since the magnet pin tumbler serves as a movable obstruction element, it is desirable to insert an arbitrary element into any one of respective penetration holes. Meanwhile, these movable obstruction elements 59 are biased toward the grooves 56 of the inner tubular member by spring members 60 having a relatively weak spring force provided in the inner holes 5 of the outer tubular member. Therefore, the key cylinder lock 51 is in a locked state before the proper magnet key 57 is inserted.

Figure 18:
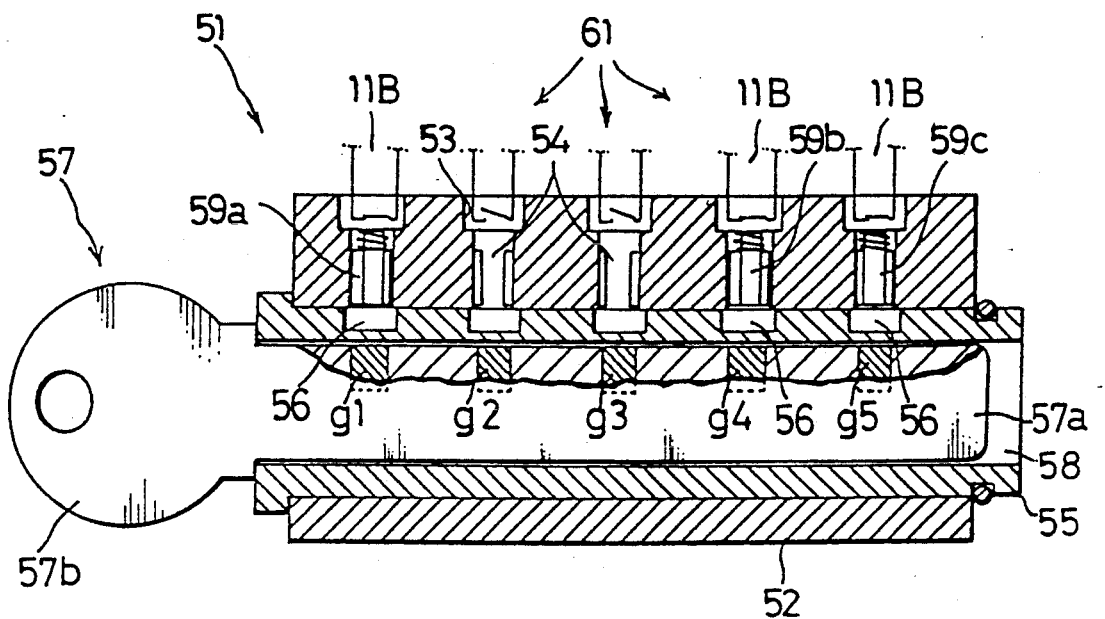

The magnet key 57 is comprised of a key body 57a inserted into the key hole, and a key holding portion 57b integrally formed with the key body 57a. As shown in FIG. 18, at the upper side portion of the key body 57a, a plurality of magnets, five magnets g1, g2, g3, g4 and g5 in total in this embodiment, are embedded with a predetermined spacing therebetween. The polarities of these plural magnets g1 and g5 ma be arbitrarily combined.

Reference numerals 61 denote a plurality of switch members each including at least a magnetic responsive switch provided in the key cylinder lock 51 of the key switch 1C and opened and closed in dependency upon insertion into the key hole 58 of the proper magnet key 57 and removal therefrom, respectively. In this embodiment, as shown in FIG. 18, these switch members are provided in correspondence with the number of outer holes 53 of the outer tubular member 52 and are suitably assembled in the outer holes 53, respectively. When a movable obstruction element 59 jumps up against the spring force of the spring member 60 from the groove 56 of the inner tubular member and becomes close to the magnetic responsive switch, the magnetic responsive switch detects this, whereby it is brought into a closed state. The magnetic responsive switch is the same structure as that of the first embodiment of this invention.

Namely, a switch 11A using a fixed contact piece 11a as a fixed contact and a movable contact piece 11b as a movable contact as shown in FIG. 6, or a magnetic responsive lead switch 11B as shown in FIG. 7 may be used.

In this embodiment, switch members 61 using at least magnetic responsive switch 11B are suitably assembled into a plurality of outer holes 53 of the outer tubular member as shown in FIG. 16 or 18, and respective switch members 61 are connected in parallel with an information receive discrimination circuit which will be described later, and are protected by a cover member (not shown).

Reference numeral 62 denotes an information receive discrimination circuit connected in parallel with the plural switch member 61 as shown in FIG. 20 and for carrying out a receive discrimination with respect to presence and absence of power supply signals respectively delivered from these switch members 61. This information receive discrimination circuit 62 can discriminate between presence and absence of a power supply signal by so called binary rotation using logic values indicating respective two logical states, e.g., "1" when the circuit 62 has received a power supply signal, and "0" when it does not receive a power supply signal. Accordingly, in the case of this embodiment, electric signals of "1", "0", "0", "1" and "1" are delivered through connection cords from the switch members 61 to the information receive discrimination circuit 62, respectively. Thus, the information receive discrimination circuit 62 discriminates "a specific value" on the basis of these electric signals.

Respective switch members 61 are electrically connected to a battery 63 mounted in a vehicle. Thus, the above-mentioned power supply signals are delivered using the battery 63 mounted in a vehicle as a power supply.

Reference numeral 64 denotes a specific code memory circuit for memorizing specific codes corresponding to combinations of open and closed sates of the above described switch members 61. These specific codes of the specific code memory circuit 64 are memorized and set in correspondence with the function that the information receive discrimination circuit 62 discriminates "a certain specific value" by two logic values of "1" and "0".

Accordingly, since magnet pin tumblers 59a, 59b and 59c assembled into the penetration holes of the key cylinder lock 51 are the first, fourth and fifth tumblers when counting from the left side in FIG. 18 in this embodiment, electric signals of "1", "0", "0", "1" and "1" are delivered from the respective switch members 61 to the information received discrimination circuit 62. Thus, "a specific value" based on such a binary notation is referred to as a specific code.

Reference numeral 65 denotes an information collative judgment circuit for making a comparison as judgment as to whether or not "a specific value" as an information signal that the information receive discrimination circuit 62 has discriminated and "a specific code" as storage information that the specific code memory circuit stores therein are in correspondence with each other.

The specific code memory circuit 64 may include a read only memory circuit (ROM) for storing plural binary bits which are specific to the specific vehicle. The information collative judgment circuit 65 may include a plurality of AND and NAND circuits for comparing the binary code stored in the specific code memory circuit 64 with the binary code information received from the magnet key 57.

Reference numeral 66 denotes a central processing unit (CPU) operative to deliver output signals to respective supply elements essential for the operation of the engine for vehicle only when it has received, from the information collative judgment circuit 68, the correspondence signal that an information signal and storage information are in correspondence with each other. As shown in FIGS. 15 and 20, an AND circuit 67 is connected to the CPU 66. In this embodiment, one input terminal of the AND circuit 67 is connected so that it can receive a correspondence signal from the information collative judgment circuit 65 biased on information signals on the side of respective switch members 61, and the other input terminal of the AND circuit 67 is connected so that it can receive an output signal from an ignition coil of the key switch 1C or an ignition switch through the connection cord 68.

Reference numeral 69 denotes a fuel injection unit, reference numeral 70 an engine ignition unit, and reference numeral 71 respective essential elements such as a capacitor. These components are respectively connected to the CPU 66. In addition, reference numeral 72 denotes a starter motor.

Figure 17:
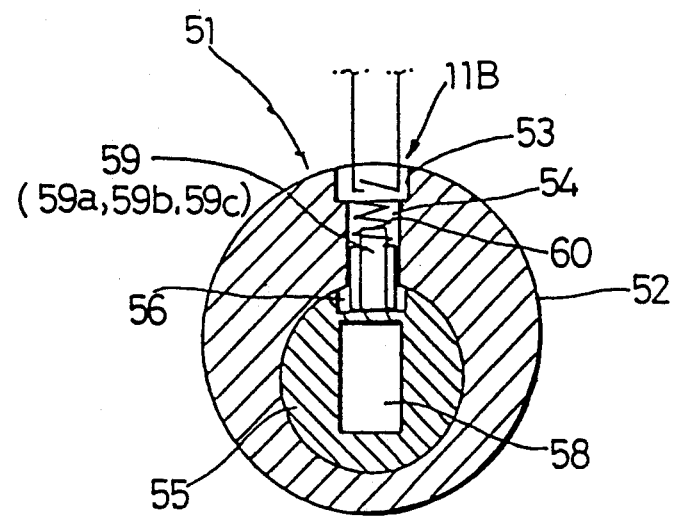

In the above construction, as shown in FIGS. 16 and 17, before the magnet key 57 is inserted into the key hole 58 of the key cylinder lock 51, a plurality of magnet pin tumblers 59a, 59b and 59c each serving as the movable obstruction element 59 are thrust by the spring members 60, so they are positioned within the grooves 56 of the inner tubular member, respectively, and a plurality of magnetic responsive switches 11B each serving as the switch member 61 are in an open state.

Figure 19:
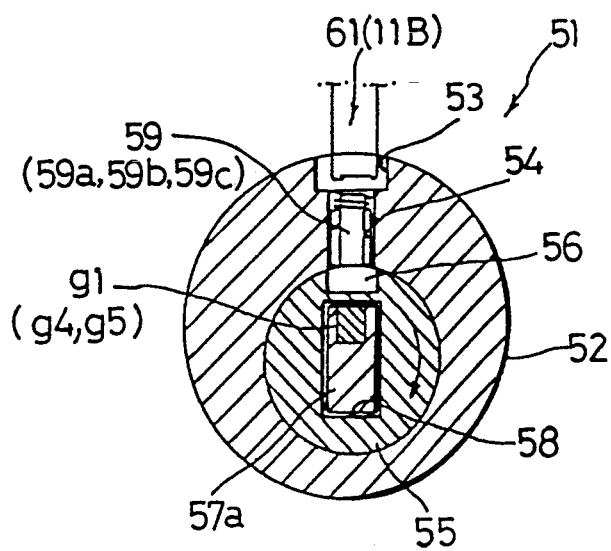

Thus, as shown in FIGS. 18 and 19, where the proper magnet key 57 is inserted into the key hole 58 of the key cylinder 51, magnetic forces of magnets g1, g4 and g5 embedded in the magnet key 57 are exerted on corresponding magnet pin tumblers 59a, 59b and 59c having the same polarity, respectively. As a result, the magnet pin tumblers 59a, 59b, 59c jump upwardly against the spring force of the spring members 60 from the grooves 56 of the inner tubular member 55, and become close to magnetic responsive switches 11B, respectively. Thus, these magnetic responsive switches 11B detect such changes, whereby they are brought into a closed state, respectively. As a result, power supply signals are delivered from the battery 63 mounted in vehicle as a power supply to the information receive discrimination circuit 6 through these magnetic responsive switches 11B, respectively.

Responding to this "a specific value" that the information receive discrimination circuit 62 has discriminated is delivered to the information collative judgment circuit 65 through the CPU 66. The information collative judgment circuit 65 inquiries the specific code memory circuit 64 of whether or not the corresponding information signal is in correspondence with storage information therein to make a comparative collation to deliver an output signal to the CPU 66 only when the both information are in correspondence with each other. When the CPU 66 receives a correspondence signal from the information collative judgment circuit 65, it delivers output signals to respective supply elements 69, 70, and 71 essential for the operation of the engine for vehicle.

When the magnet key 57 is rotationally moved, so the key switch 1C is passed through the "ON" position, an output signal on the ignition coil side is input to the AND circuit 67, etc., through the connection cord 68 and the CPU 66. The AND circuit 67 discriminates that the output signal on the ignition coil side and the correspondence signal on the information collative judgment circuit 65 side are input at the same time to deliver an output signal to the engine ignition unit 70.

A controller 73, including the CPU 66 as the center, drives and controls the engine ignition unit 70, the fuel injection unit 69, and the like, and further seats the magnet key 57 so that it is located at the position of "ST", whereby the starter motor 72 is rotated, so that engine is started.

On the other hand, where a key other than the proper magnet key 57 is inserted into the key hole 58 of the key cylinder lock 51, movable obstruction element 59 are not entirely moved, or all magnet pin tumblers 59a, 59b and 59c do not jump upwardly, so respective magnetic responsive switches 11B are not entirely brought into a closed state, or one or some magnetic responsive switches 11B are not brought into a closed state. Accordingly, even if power supply signals are delivered from the power supply 63 to the information receive judgment circuit 62 through respective switch members 61, it is eventually judged at the information collative judgment circuit 65 that an information signal discriminated circuit 62 is not in correspondence with storage information of the specific code memory circuit 64. As a result, no output signal is delivered to the AND circuit 67. Accordingly, even if the starter motor 72 is activated, the engine is not started.

It is to be noted that where a plurality of switch members 61 are provided in the key cylinder lock 51 also in the second embodiment, a design change may be made such that an arrangement similar to that of the different embodiment of the first embodiment is provided.

As is clear from the foregoing description, this invention provides the advantages recited below.

It is prevented that the engine is started by unfair means such as a duplicate key, direct connection of electric wires, or the like.

Since proper magnet key inserted into the key cylinder lock of a vehicle and switch members provided in the key cylinder lock which is opened and closed in response to insertion and removed of the magnet key, there is no possibility that the magnet key is damaged and there is extremely little possibility that the mechanical key cylinder lock becomes out of order. Accordingly, there is little possibility that the engine is unable to be started by damage to the magnet key or trouble in the key cylinder.

In the case of the first embodiment, it is sufficient to employ a scheme to use power supply signals delivered from the power supply as information, and to provide, at a suitable portion of the electric circuit input signal discrimination means for cutting off output signals to supply elements essential for the operation of the engine for the vehicle in the case of a key other than the proper magnet key. Accordingly, installation is very easy.

In the case of the second embodiment, since the key cylinder lock and the controller including CPU can be arranged at places away from each other, and since the information receive discrimination circuit, the specific code memory circuit, and the information collative judgment circuit, etc., are connected to CPU, it is possible to securely prevent an unjust action such that, e.g., a thief directly connects wiring to drive the engine.

By the number or the relationship of assembled positions of movable obstruction elements accommodated into a plurality of penetration holes of the key cylinder lock, it is possible to extremely easily set which switch member of plural switch members should be opened or closed.

In the case of the embodiment using a key cylinder lock wherein magnetic responsive switches as respective switch members are used, and the magnetic responsive switches are caused to be in a closed state through jumping up of magnet pin tumblers by inserting the magnet key into the key hole, as long as the magnet key is inserted into the key hole, since respective magnet pin tumblers are supported on the outer circumferential surface of the inner tubular member, even if the magnet key is rotationally moved, such a closed state is continued.

Accordingly there is n necessity of using other members such as signal hold means.

What is claimed is:

1. A burglarproof ignition device for a vehicle comprising:
   a key cylinder lock for the vehicle including an outer tubular member and an inner tubular member rotatably provided within said outer tubular member,
   a plurality of axially aligned radially extending holes in said outer tubular member,
   a plurality of axially aligned grooves in said inner tubular member aligned radially with said plurality of axially aligned radially extending holes in said outer tubular member,
   a properly coded magnet key adapted to be inserted into said inner tubular member, with a magnet positioned thereon to align with at least some of said grooves in said inner tubular member, a spring loaded magnet pin positioned in each of said plurality of axially aligned radially extending holes in said outer tubular member which correspond radially to a magnet positioned on said key, each of said spring loaded magnet pins extend into each of said grooves in said inner tubular member which correspond to the magnets on said key and which are biased toward said inner tubular member,
   a switch member provided in each of said radially extending holes in said outer tubular member which include a spring loaded magnet pin, each switch member is closed in response to insertion of said properly coded magnet key into said inner tubular member and opened in response to removal of said properly coded magnet key,
   an information receive discrimination circuit for carrying out a receive discrimination with respect to presence and absence of power supply signals respectively delivered via each said switch member by a power delivered from a battery as a power supply mounted in said vehicle,
   an information collative judgment circuit adapted to receive an information signal from said information receive discrimination circuit to make a comparative collation between storage information provided by making reference to a specific code memory circuit in which specific codes corresponding to combinations of open and closed states of each said switch member are stored in advance, and said information signal, and a central processing until are operative to deliver output signals to supply elements essential for the operation of an engine for the vehicle only when it receives, from said information collative judgment circuit, a correspondence signal indicating that said storage information and said information signal are in correspondence with each other.

2. A burglarproof ignition device as set forth in claim 1, wherein each said switch member is comprised of a magnetic responsive switch, and is brought into a closed state directly through an upward movement of a magnet pin tumbler by inserting said magnet key into said inner tubular member.

3. A burglarproof ignition device for a vehicle comprising:
- a key cylinder lock for the vehicle including an outer tubular member and an inner tubular member rotatably provided within said outer tubular member,
- a plurality of axially aligned radially extending holes in said outer tubular member,
- a plurality of axially aligned grooves in said inner tubular member aligned radially with said plurality of axially aligned radially extending holes in said outer tubular member,
- a properly coded magnet key adapted to be inserted into said inner tubular member, with magnets positioned thereon to align with at least some of said grooves in said inner tubular member, a spring loaded magnet pin tumbler positioned in each of said plurality of axially aligned radially extending holes in said outer tubular member which corresponds radially to a magnet positioned on said key, each of said spring loaded magnet pin tumblers extend into each of said grooves in said inner tubular member which correspond to the magnets on said key and which are biased toward said inner tubular member,
- a magnetic responsive switch member provided in each of said radially extending holes in said outer tubular member that contains a spring loaded magnet pin tumbler, each of said magnetic responsive switch members is closed in response to insertion of said properly coded magnet key into said inner tubular member and opened in response to removal of said properly coded magnet key, and
- input signal discrimination means for cutting off output signals to power supply elements essential for the operation of an engine for the vehicle in the case of the insertion of a key other than said properly coded magnet key.

4. A burglarproof ignition device as set forth in claim 3, wherein said input signal discrimination means includes an AND circuit.

5. A burglarproof ignition device as set forth in claim 3, which further includes an additional switch member which is closed only when said magnet key is inserted into said inner tubular member and rotated.

6. A burglarproof ignition device as set forth in claim 5, wherein said input signal discrimination means includes an AND circuit which receives inputs from each said switch member and from said additional switch member.

7. A burglarproof ignition device as set forth in claim 3, wherein said magnet key includes a plurality of magnets embedded therein spaced along the length of said key, the polarities of said magnets being combined to produce a binary code.

8. A burglarproof ignition device as set forth in claim 7, wherein each said switch member spaced along said outer tubular member corresponds to the spacing of said magnets in said magnet key.

9. A burglarproof ignition device as set forth in claim 8, wherein each said switch member is opened and closed by a movable obstruction element.

10. A burglarproof ignition device as set forth in claim 9, wherein said obstruction elements are magnet pin tumblers which are moved outward in said outer tubular member by corresponding magnets of said plurality of magnets embedded in said magnet key.

11. A burglarproof ignition device as set forth in claim 10, wherein said obstruction elements are held in said outward position by the outer surface of said inner tubular member when said inner tubular member is rotated by said properly coded magnet key.

12. A burglarproof ignition device for a vehicle comprising:
- a key cylinder lock for the vehicle including an outer tubular member and an inner tubular member rotatably provided within said outer tubular member,
- a properly coded magnet key adapted to be inserted into said inner tubular member, said properly coded magnet key including a mechanical coding along one edge of said key and a magnetic coding along the opposite edge of said key,
- a plurality of axially aligned radially extending holes in said outer tubular member,
- a plurality of axially aligned grooves in said inner tubular member aligned radially with said plurality of axially aligned radially extending holes in said outer tubular member,
- a magnetically operated switch member provided in each of said radially extending holes in said outer tubular member, each of which is closed in response to insertion of said properly coded magnet key, and each of which is opened in response to removal of said properly coded magnet key,
- an additional switch member which becomes closed in response to the rotation of said magnet key in said inner tubular member, and
- input signal discrimination means for cutting off output signals to power supply elements essential for the operation of an engine for the vehicle in the case of attempted use of a key other than said properly coded magnet key, said input signal discrimination means including an AND circuit which receives an input from each magnetically operated switch member provided in said radially extending holes and from said additional switch member.

13. A burglarproof ignition device as set forth in claim 12, wherein each said magnetically operated switch member spaced along said outer tubular member corresponds to the spacing of said magnets in said magnet key.

14. A burglarproof ignition device as set forth in claim 13, wherein each said magnetically operated switch member is closed by a movable obstruction element when said key is inserted into said inner tubular member and opened when said key is removed from said inner tubular member.

15. A burglarproof ignition device as set forth in claim 14, wherein said obstruction elements are magnet pin tumblers which are moved outward in said radially extending holes in said outer tubular member by corresponding magnets of said plurality of magnets embedded in said magnet key.

16. A burglarproof ignition device as set forth in claim 15, wherein said obstruction elements are held in said outward position by the outer surface of said inner tubular member when said inner tubular member is rotated by said properly coded magnet key.

17. A burglarproof ignition device as set forth in claim 12, wherein said magnet key includes a plurality of magnets embedded therein spaced along the length of said key, the polarities of said magnets being combined to produce a binary code.

18. A burglarproof ignition device as set forth in claim 12, wherein each said magnetically operated switch member includes a magnetic responsive switch which is brought into a closed state by inserting said properly coded magnet key into said inner tubular member.

19. A burglarproof ignition device as set forth in claim 12, wherein each said magnetically operated switch member is individually closed in response to the insertion of said magnet key and opened in response to removal of said magnet key.

* * * * *